United States Patent
Ishikawa (10) Patent No.: US 12,497,197 B2
(45) Date of Patent: Dec. 16, 2025

(54) FLYING APPARATUS AND METHOD FOR CONTROLLING THE SAME

(71) Applicant: ISHIKAWA ENERGY RESEARCH CO., LTD., Ota (JP)

(72) Inventor: Mitsuru Ishikawa, Ota (JP)

(73) Assignee: ISHIKAWA ENERGY RESEARCH CO., LTD., Ota (JP)

( * ) Notice: Subject to any disclaimer, the term of this patent is extended or adjusted under 35 U.S.C. 154(b) by 0 days.

(21) Appl. No.: 18/857,754

(22) PCT Filed: Aug. 21, 2023

(86) PCT No.: PCT/JP2023/029976
§ 371 (c)(1),
(2) Date: Oct. 17, 2024

(87) PCT Pub. No.: WO2024/053375
PCT Pub. Date: Mar. 14, 2024

(65) Prior Publication Data
US 2025/0276816 A1    Sep. 4, 2025

(30) Foreign Application Priority Data
Sep. 8, 2022 (JP) .................................. 2022-143239

(51) Int. Cl.
*B64U 10/14* (2023.01)
*B64U 30/295* (2023.01)
(Continued)

(52) U.S. Cl.
CPC ........... *B64U 10/14* (2023.01); *B64U 30/295* (2023.01); *B64U 50/30* (2023.01); *H02P 29/40* (2016.02)

(58) Field of Classification Search
CPC ...... B64U 10/14; B64U 30/295; B64U 50/30; H02P 29/40
See application file for complete search history.

(56) References Cited

U.S. PATENT DOCUMENTS 2,709,895 A * 6/1955 Mount .................... F02K 7/005
                                                           60/39.35
8,019,492 B2 * 9/2011 Halaas ................. G05D 1/0061
                                                           244/76 R
(Continued)

FOREIGN PATENT DOCUMENTS

JP      2014-36465 A    2/2014
JP      2015-48025 A    3/2015
(Continued)

OTHER PUBLICATIONS

Notice of Allowance dated Oct. 4, 2022, issued in counterpart JP Application No. 2022-143239, with English translation. (5 pages).
(Continued)

*Primary Examiner* — Medhat Badawi
(74) *Attorney, Agent, or Firm* — WHDA, LLP (57) ABSTRACT

Provided is a flying apparatus and a method for controlling the same which are capable of precisely measuring a remaining charge of a battery with a simple configuration. A flying apparatus 10 comprises a rotor 11, a motor 12, a power converting unit 14, a battery 21, and a calculation control unit 15. The rotor 11 rotates to generate thrust for causing an airframe base unit 16 to float, and the motor 12 is supplied with an electric power from the battery 21 to rotationally drive the rotor 11. The calculation control unit 15 generates an instruction signal to bring the airframe base unit 16 into a certain positional posture. The power converting unit 14 adjusts an electric power to be supplied from the battery 21 to the motor 12 based on the instruction signal inputted. Further, the calculation control unit 15 estimates a remaining charge of the battery 21 based on the instruction signal.

8 Claims, 4 Drawing Sheets

(51) Int. Cl.
*B64U 50/30* (2023.01)
*H02P 29/40* (2016.01)

(56) References Cited

U.S. PATENT DOCUMENTS

| | | | | |
|---|---|---|---|---|
| 10,564,650 | B2* | 2/2020 | Gomez Gutierrez | B64U 30/20 |
| 11,119,507 | B2* | 9/2021 | Parra Vilchis | G06F 7/556 |
| 11,945,579 | B1* | 4/2024 | Nielsen | B64U 60/50 |
| 12,227,318 | B1* | 2/2025 | Bata | B64U 20/83 |
| 2012/0095621 | A1* | 4/2012 | Zhu | G05D 1/0825 700/32 |
| 2017/0088261 | A1* | 3/2017 | Sequeira | G01S 13/0209 |
| 2019/0033892 | A1* | 1/2019 | Gomez Gutierrez | B64U 30/20 |
| 2019/0299944 | A1* | 10/2019 | Nilsson | B60T 7/042 |
| 2020/0073410 | A1* | 3/2020 | Tillotson | G05D 1/0816 |
| 2020/0185443 | A1* | 6/2020 | Itabasi | G02B 1/11 |
| 2021/0016880 | A1* | 1/2021 | Ishikawa | F02B 63/04 |
| 2022/0388635 | A1* | 12/2022 | Ishikawa | B64C 25/26 |
| 2023/0221166 | A1* | 7/2023 | Ono | B64C 39/024 177/136 |
| 2024/0132208 | A1* | 4/2024 | Leal | B64C 39/024 |
| 2024/0132235 | A1* | 4/2024 | Suzuki | B64C 27/33 |
| 2024/0181825 | A1* | 6/2024 | Rocha | B60F 5/02 |
| 2024/0204493 | A1* | 6/2024 | Eide | B64U 10/60 |
| 2024/0228076 | A1* | 7/2024 | Kozlenko | B64U 20/40 |
| 2024/0300681 | A1* | 9/2024 | Shkolnik | B64D 27/357 |
| 2024/0327044 | A1* | 10/2024 | Silin | B64U 50/19 |
| 2024/0336379 | A1* | 10/2024 | Ishikawa | B64C 27/14 |
| 2024/0343423 | A1* | 10/2024 | Ishikawa | B64C 27/08 |
| 2024/0343425 | A1* | 10/2024 | Ishikawa | B64U 10/16 |
| 2025/0019096 | A1* | 1/2025 | Mayounove | B64U 30/297 |
| 2025/0019098 | A1* | 1/2025 | Mayounove | B64U 20/70 |
| 2025/0033761 | A1* | 1/2025 | Ishikawa | B64U 30/24 |
| 2025/0051046 | A1* | 2/2025 | Ben-Moshe | G05D 1/654 |
| 2025/0108942 | A1* | 4/2025 | Ishikawa | B64C 27/08 |
| 2025/0178755 | A1* | 6/2025 | Zarrouk | B64U 50/23 |
| 2025/0214723 | A1* | 7/2025 | Ishikawa | B64D 31/06 |
| 2025/0253676 | A1* | 8/2025 | Nakamura | H02J 7/00304 |

FOREIGN PATENT DOCUMENTS

| | | |
|---|---|---|
| JP | 2018-55463 A | 4/2018 |
| JP | 2021-34960 A | 3/2021 |
| WO | 2020/004366 A1 | 1/2020 |

OTHER PUBLICATIONS

International Search Report dated Oct. 24, 2023, issued in counterpart International Application No. PCT/JP2023/029976, with English Translation. (5 pages).

Written Opinion of the International Searching Authority (Form PCT/ISA/237) dated Oct. 24, 2023, issued in counterpart International Application No. PCT/JP2023/029976. (3 pages).

* cited by examiner

FLYING APPARATUS AND METHOD FOR CONTROLLING THE SAME

TECHNICAL FIELD

The present invention relates to a flying apparatus and a method for controlling the same.

BACKGROUND ART

A flying apparatus capable of flying in the air in an unmanned manner has been conventionally known. Such a flying apparatus is capable of flying in the air by using thrust of a rotor which is rotationally driven about a vertical axis.

As the fields to which flying apparatuses are applied, for example, a transportation field, a survey field, an imaging field, an agriculture field, and the like are considered. In the case where a flying apparatus is applied to such a field, the flying apparatus is equipped with various devices or drugs.

When considering flying a flying apparatus stably, it is necessary to measure a remaining charge of a battery included in the flying apparatus. Patent Literature 1 describes estimating a remaining charge of a battery during the flight of a flying apparatus.

Patent Literature 1 describes a matter of estimating the amount of charge of the battery based on one or a plurality of values among a battery voltage, a battery temperature, and a current. Further, Patent Literature 1 also describes calculating a calculated remaining charge value called SOC by measuring the battery voltage, the current, and the battery temperature, and estimating the amount of charge. Moreover, Patent Literature 1 also describes correcting the amount of charge of the battery estimated by the above-mentioned method, based on one or a plurality of values among an actual time of use, an ambient temperature, and the like of the battery.

CITATION LIST

Patent Literature

Patent Literature 1: International Publication No. WO2020/004366

SUMMARY OF INVENTION

Technical Problem

However, in the flying apparatus described in the above-described Patent Literature 1, there has been room for improvement from the viewpoint of measuring the remaining charge of the battery of the flying apparatus precisely at low cost.

Specifically, although it is possible to estimate the remaining charge of the battery based on the voltage of the electric power supplied from the battery, there has been a problem that the remaining charge cannot be precisely estimated by such a method.

Figure 6:
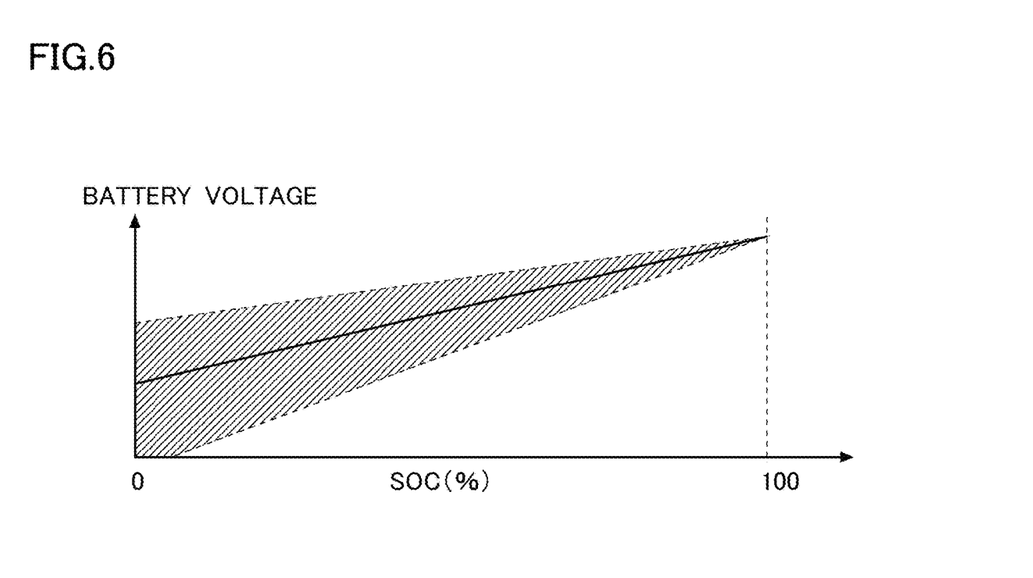
FIG. 6 is a graph showing a relation between a battery voltage and SOC in a flying apparatus according to a background art.

This problem will be described with reference to FIG. 6. In FIG. 6, the horizontal axis indicates SOC, and the vertical axis indicates the voltage of the battery. Here, SOC is an abbreviation of State Of Charge, and is an index representing the charging rate or the charging state of the battery.

In general, SOC and battery voltage have a linear relation. That is, a large battery voltage indicates large SOC. In FIG. 6, the linear relation between SOC and battery voltage is indicated by a solid line. However, the linear relation varies depending on the state of the battery and the external environment. For example, the linear relation varies depending on the degradation with time of the battery and the external temperature environment. In FIG. 6, a region in which the linear relation can vary is indicated by hatching. From this, it has not been easy to uniquely calculate SOC from a battery voltage value.

In addition, it is also possible to estimate the remaining charge of the battery based on a current value of an electric power supplied from the battery. However, since the estimation method based on a current value needs a sensor dedicated for measuring the current value, there has been a problem that such a measure brings about an increase in cost and an increase in weight.

The present invention has been made in view of the above-described circumstances, and an object thereof is to provide a flying apparatus and a method for controlling the same which are capable of precisely measuring a remaining charge of a battery with a simple configuration.

Solution to Problem

A flying apparatus of the present invention comprises: a rotor; a motor; a power converting unit; a battery; and a calculation control unit, wherein the rotor rotates to generate thrust for causing an airframe base unit to float, the motor is supplied with an electric power from the battery to rotationally drive the rotor, the calculation control unit generates an instruction signal to bring the airframe base unit into a certain positional posture, the power converting unit adjusts the electric power to be supplied from the battery to the motor based on the instruction signal inputted, and further the calculation control unit estimates a remaining charge of the battery based on the instruction signal.

The present invention is a method for controlling a flying apparatus including a rotor, a motor, a power converting unit, a battery, and a calculation control unit, the method comprising: rotating the rotor to generate thrust for causing an airframe base unit to float; supplying the motor with an electric power from the battery to rotationally drive the rotor; causing the calculation control unit to generate an instruction signal to bring the airframe base unit into a certain positional posture; causing the power converting unit to adjust the electric power to be supplied from the battery to the motor based on the instruction signal inputted; and further causing the calculation control unit to estimate a remaining charge of the battery based on the instruction signal.

Advantageous Effects of Invention

According to the flying apparatus of the present invention, the remaining charge of the battery can be precisely estimated without need of a sensor dedicated for measuring a current value or a voltage value of the battery, by estimating the remaining charge of the battery based on the instruction signal.

DESCRIPTION OF EMBODIMENTS

Hereinafter, a flying apparatus 10 according to the present embodiment will be described with reference to the drawings. In the following description, the same members are denoted by the same reference signs in principle, and repetitive description will be omitted. In addition, in the following description, upper, lower, front, rear, left, and right directions are used, where the left and right directions are left and right directions in the case where the flying apparatus 10 is viewed from the front side in FIG. 1A.

Figure 1A:
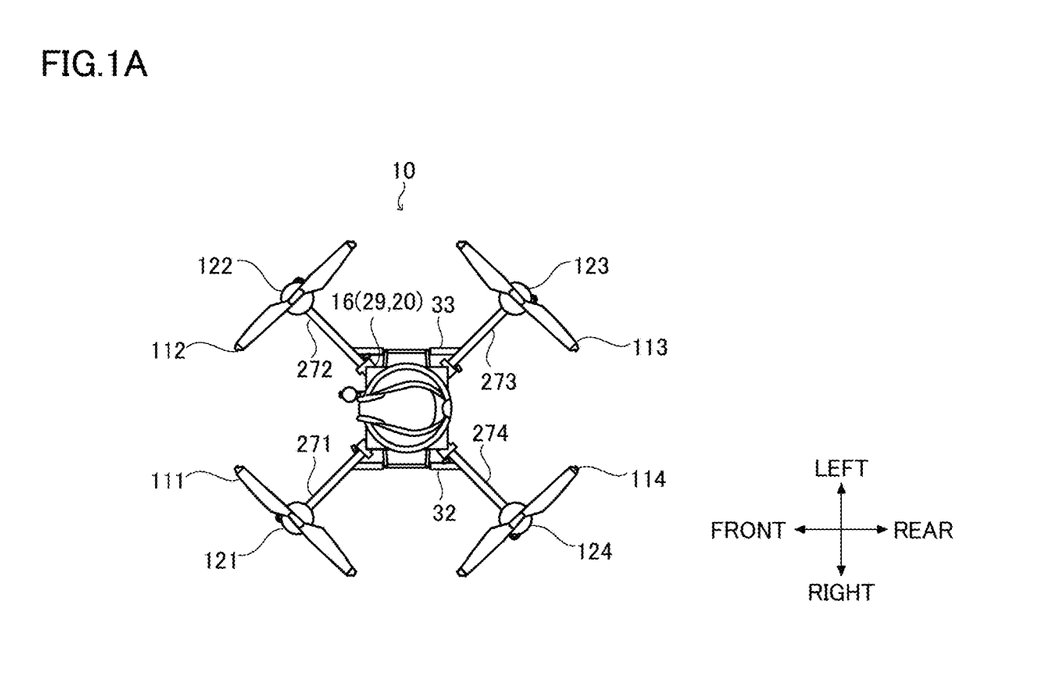
FIG. 1A is a top view showing a flying apparatus according to an embodiment of the present invention.
Figure 1B:
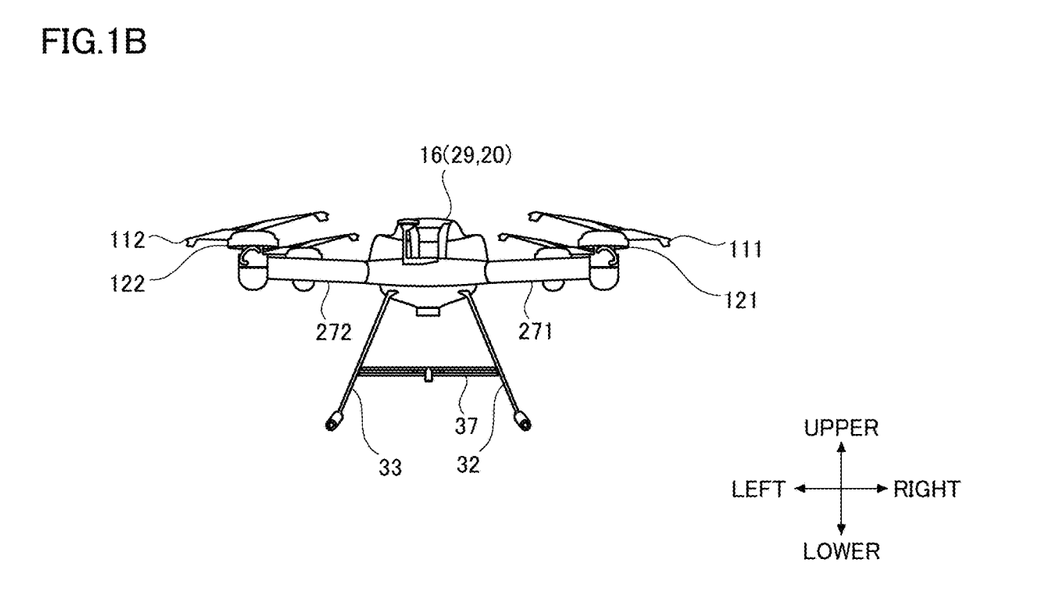
FIG. 1B is a front view showing the flying apparatus according to the embodiment of the present invention.

FIG. 1A is a top view showing the flying apparatus 10, and FIG. 1B is a front view showing the flying apparatus 10.

With reference to FIG. 1A, the flying apparatus 10 mainly includes an airframe base unit 16, a power unit which is mounted on the airframe base unit 16 and is not shown here, arms 271 and the like which extend from peripheral portions of the airframe base unit 16 to a periphery, motors 121 and the like which are disposed on outer end portions of the arms 271 and the like, and rotors 111 and the like which are rotated by the motors 121 and the like. In the following description, the motors 121 and the like are collectively referred to as motors 12, and the rotors 111 and the like are collectively referred to as rotors 11.

The flying apparatus 10 is capable of floating and moving in the air by causing the motors 121 and the like to rotate the rotors 111 and the like at certain rotation speeds by using an electric power obtained from a battery 21 housed in the airframe base unit 16.

The airframe base unit 16 is disposed at the center of the flying apparatus 10, and various devices, which are not shown here, are housed in the airframe base unit 16. The outer surface of the airframe base unit 16 is covered with a synthetic resin plate or a steel plate which is molded in a predetermined shape.

The arm 271, the arm 272, the arm 273, and the arm 274 extend outward from a power converting unit 14.

The motor 121 and the rotor 111 are disposed in an outer end portion of the arm 271. The motor 122 and the rotor 112 are disposed in an outer end portion of the arm 272. The motor 123 and the rotor 113 are disposed in an outer end portion of the arm 273. The motor 124 and the rotor 114 are disposed in an outer end portion of the arm 274. Here, the rotors 111 and the like rotate to generate thrust for causing the airframe base unit 16 to float. In addition, the motors 121 and the like rotationally drive the rotors 111 and the like.

With reference to FIG. 1B, the leg portion 32 and the leg portion 33, which come into contact with the ground at the time of landing, are disposed on a lower portion of the airframe base unit 16. The leg portion 32 and the leg portion 33 are members which are also referred to as skids. In the state where the flying apparatus 10 is landing, the lower ends of the leg portion 32 and the leg portion 33 come into contact with the ground.

Figure 2:
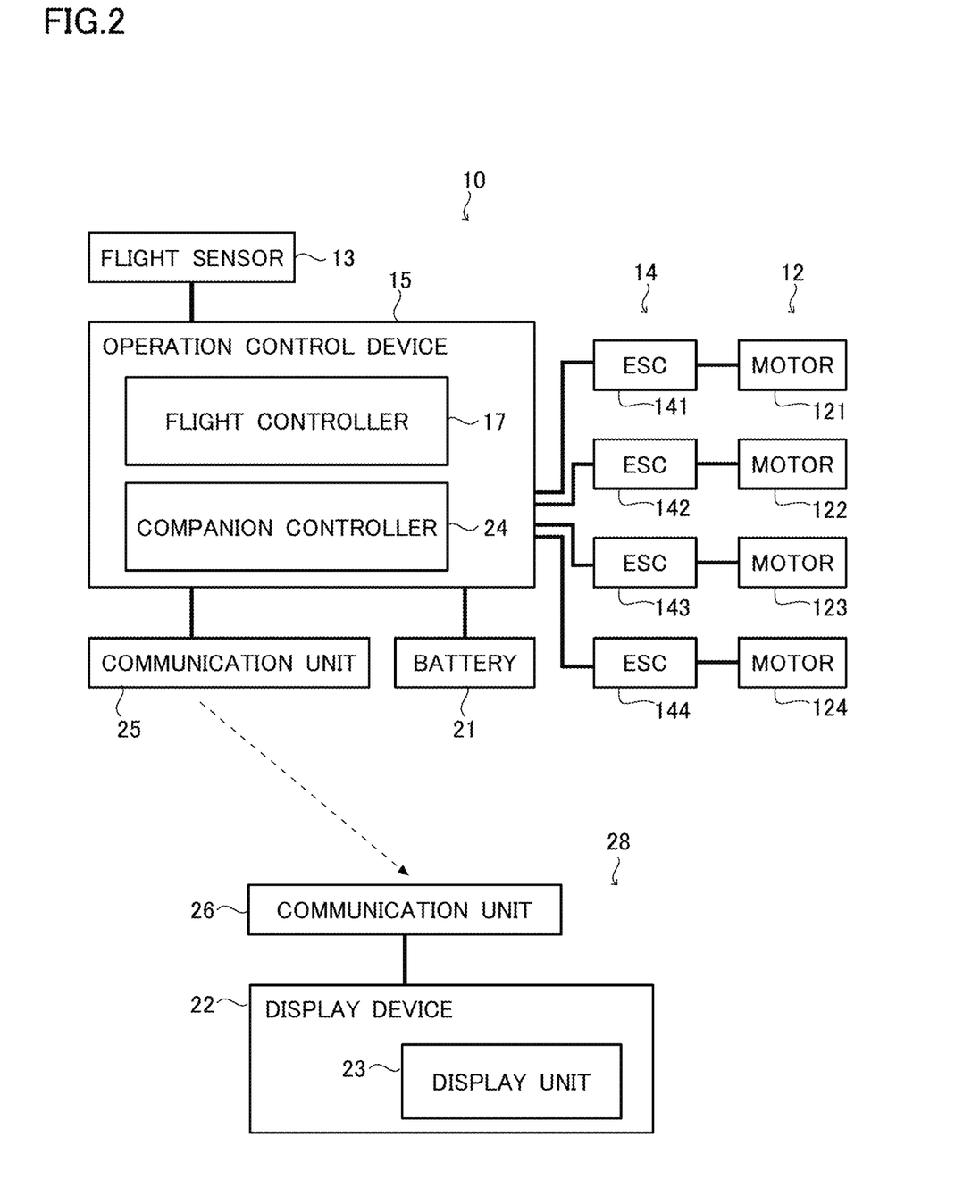
FIG. 2 is a block diagram showing a connection configuration of the flying apparatus according to the embodiment of the present invention.

FIG. 2 is a block diagram showing a connection configuration of the flying apparatus 10.

The flying apparatus 10 mainly includes the motors 12 and the like, a flight sensor 13, a power converting unit 14, and a calculation control unit 15. Moreover, the flying apparatus 10 includes a communication unit 25, a battery 21, and the power converting unit 14. An operating device 28 is a device which the operator who operates the flying apparatus 10 manipulates on the ground. A communication unit 26, a display device 22, and a display unit 23 are set near the operator.

The flight sensor 13 measures physical amounts acting on the airframe base unit 16 and transmits signals indicating the magnitudes of the physical amounts to the calculation control unit 15. Specifically, sensors included in the flight sensor 13 are, for example, an acceleration sensor, an angular rate sensor, a geomagnetic sensor, an atmospheric pressure sensor, and a GNSS antenna. The acceleration sensor detects changes in tilt and movement as physical amounts. The angular rate sensor detects changes in tilt and direction as physical amounts. The geomagnetic sensor detects a direction as a physical amount by means of a magnetic force. The atmospheric pressure sensor detects the altitude as a physical amount. The GNSS antenna specifies the position.

The calculation control unit 15 includes a calculation device composed of a CPU (Central Processing Unit) and a storage device composed of a RAM (Random Access Memory) and a ROM (Read Only Memory), and controls the operation of the entire flying apparatus 10. As described later, the calculation control unit 15 adjusts the amount of electric power to be supplied to the motors 121 and the like based on the signals inputted from the flight sensor 13. Moreover, as described later, the calculation control unit 15 calculates SOC which corresponds to the remaining battery charge of the battery 21 based on the magnitude of an instruction signal.

The calculation control unit 15 includes a flight controller 17 and a companion controller 24.

The flight controller 17 generates an instruction signal for obtaining a predetermined positional posture, moving speed, and the like of the flying apparatus 10 based on the signals inputted from the flight sensor 13. As this instruction signal, a DUTY value in the PWM control can be employed, for example. Since the present embodiment includes the four motors 121, 122, 123, and 124, a DUTY value is calculated for each motor 121. Here, as the instruction signal, an index other than a DUTY value in the PWM control can also be employed, and for example, an index in the PFM control, an index in the pulse height modulation method, or the like can be employed.

The companion controller 24 calculates the SOC of the battery 21 based on information inputted from the flight controller 17, for example, information inputted from the flight sensor 13, information indicating the voltage of the battery 21, and the like.

The power converting unit 14 includes an ESC 141 to an ESC 144. Here, ESC is abbreviation of Electric Speed Controller, and is an electronic device which controls the number of revolutions of the motor 12. The power converting unit 14 receives an electric power supplied from the battery 21, generates an alternating-current power having a predetermined frequency based on the DUTY value supplied from the calculation control unit 15, and supplies the alternating-current power to each motor 12.

The ESC 141 is disposed between the motor 121 and the calculation control unit 15 and the battery 21 and controls the number of revolutions of the motor 121. The ESC 142 is disposed between the motor 122 and the calculation control unit 15 and the battery 21 and controls the number of revolutions of the motor 122. The ESC 143 is disposed between the motor 123 and the calculation control unit 15 and the battery 21 and controls the number of revolutions of the motor 123. The ESC 144 is disposed between the motor 124 and the calculation control unit 15 and the battery 21 and controls the number of revolutions of the motor 124. When the DUTY values inputted from the flight controller 17 are large, the ESC 141 to the ESC 144 rotate the motor 121 to the motor 124 at a high speed.

Here, the basic flight operation of the flying apparatus 10 will be described. The flying apparatus 10 is capable of executing each operation of an ascending operation, a hovering operation, a moving operation, and a descending operation. The operation of the flying apparatus 10 is executed by the flight controller 17 based on a command transmitted from the operating device 28 based on the manipulation of the operator.

In each of the above-described operations, the flight controller 17 adjusts the rotation speeds of the motor 121 to the motor 124 to obtain a certain posture of the flying apparatus 10 based on information inputted from the acceleration sensor and the angular rate sensor included in the flight sensor 13.

In the ascending operation, the flight controller 17 rotates the motors 12 at a relatively high speed such that the flying apparatus 10 ascends to a certain altitude. The flight controller 17 basically outputs substantially equal DUTY values to the ESC 141 to the ESC 144 to make the rotation speeds of the motor 121 to the motor 124 substantially equal to one another. In addition, once the flying apparatus 10 is determined to have ascended to a certain altitude based on information inputted from the atmospheric pressure sensor included in the flight sensor 13, the flight controller 17 executes the hovering operation of maintaining the altitude of the flying apparatus 10 at a substantially constant level.

In the hovering operation, the flight controller 17 adjusts the rotation speeds of the motor 121 to the motor 122 such that the altitude of the flying apparatus 10 becomes substantially constant based on information inputted from the atmospheric pressure sensor included in the flight sensor 13. Here, basically, the flight controller 17 outputs substantially equal DUTY values to the ESC 141 to the ESC 144 to make the rotation speeds of the motor 121 to the motor 124 substantially equal to one another.

In the moving operation, the flight controller 17 adjusts the rotation speeds of the motor 121 to the motor 124 such that the flying apparatus 10 can move in each of the front, rear, left, and right directions at a certain speed. For example, the flight controller 17 makes the rotation speeds of the motor 121 and the motor 122 higher than the rotation speeds of the motor 123 and the motor 124. That is, the flight controller 17 makes the DUTY values to be outputted to the ESC 141 and the ESC 142 larger than the DUTY values to be outputted to the ESC 143 and the ESC 144. In this way, with reference to FIG. 1A, the rotor 111 and the rotor 112 rotate at higher speeds than the rotor 113 and the rotor 114, so that the airframe base unit 16 of the flying apparatus 10 is brought into a tilted posture and the flying apparatus 10 moves toward a certain direction.

Thereafter, once it is detected that the flying apparatus 10 has reached a certain position based on outputs of the GNSS antenna and the like included in the flight sensor 13, the flight controller 17 execute a brake operation. For example, the flight controller 17 makes the rotation speeds of the motor 121 and the motor 122 lower than the rotation speeds of the motor 123 and the motor 124. That is, the flight controller 17 makes the DUTY values to be outputted to the ESC 143 and the ESC 144 larger than the DUTY values to be outputted to the ESC 141 and the ESC 142. In this way, with reference to FIG. 1A, the rotor 111 and the rotor 112 rotate at lower speeds than the rotor 113 and the rotor 114, so that the planar movement of the flying apparatus 10 can be stopped. Thereafter, the flight controller 17 executes the hovering operation.

In the descending operation, the flight controller 17 rotates the motors 12 at a relatively low speed such that the flying apparatus 10 descends to a certain altitude. The flight controller 17 basically outputs substantially equal DUTY values to the ESC 141 to the ESC 144 to make the rotation speeds of the motor 121 to the motor 124 substantially equal to one another. In addition, once the flying apparatus 10 is determined to have descended to a certain altitude based on information inputted from the atmospheric pressure sensor included in the flight sensor 13, the flight controller 17 executes the hovering operation of maintaining the altitude of the flying apparatus 10 at a substantially constant level.

Figure 3:
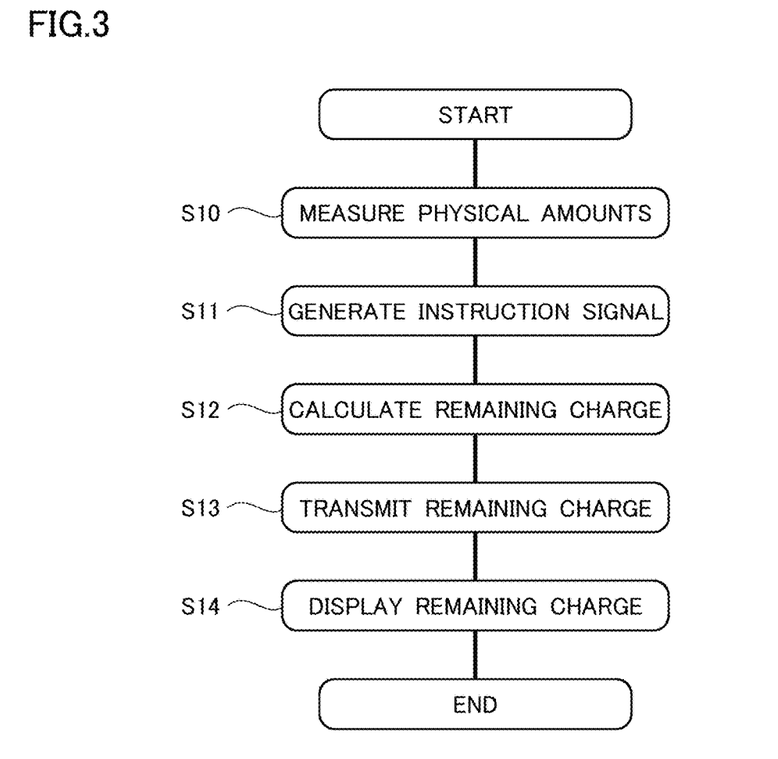
FIG. 3 is a flowchart showing a method for calculating an estimated weight value of a transported object in the flying apparatus according to the embodiment of the present invention.

FIG. 3 is a flowchart showing a method for calculating the SOC of the battery 21 in the flying apparatus 10.

In step S10, the flight sensor 13 measures physical amounts. Specifically, the acceleration sensor, the angular rate sensor, the geomagnetic sensor, the atmospheric pressure sensor, the GNSS antenna, and the like included in the flight sensor 13 measure the positional posture and the like of the flying apparatus 10. The physical amounts measured by the flight sensor 13 are inputted into the flight controller 17. In addition, the operation state during the flight of the flying apparatus 10 is also inputted into the flight controller 17.

In step S11, the flight controller 17 calculates DUTY values as instruction signals based on the aforementioned physical amounts. The flight controller 17 outputs the DUTY values based on various kinds of information, the operation state, and the like inputted in step S10. The flight controller 17 calculates the DUTY value for each of the ESC 141 to the ESC 144 shown in FIG. 2.

In step S12, the companion controller 24 calculates an estimated SOC of the battery 21. Specifically, the companion controller 24 sets in advance a conversion formula indicating a correlation between a DUTY integrated value, which is an integrated value of DUTY values, and SOC. Next, the companion controller 24 calculates a DUTY integrated value, which is an integrated value of DUTY values after the flight of the flying apparatus 10 is started, at a certain interval. Next, the companion controller 24 calculates the SOC of the battery 21 by using this conversion formula.

Figure 4:
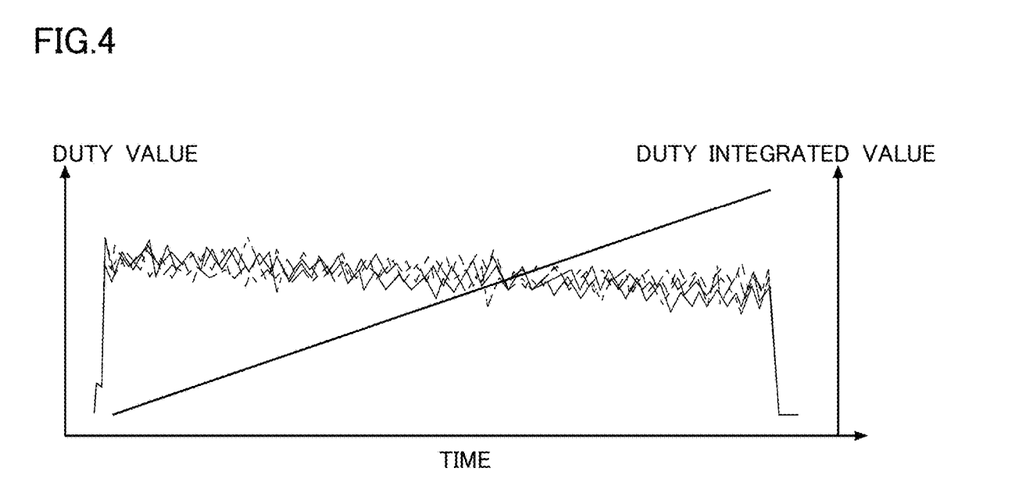
FIG. 4 is a graph showing changes with time of a DUTY value and a DUTY integrated value in the flying apparatus according to the embodiment of the present invention.

FIG. 4 is a graph showing changes with time of the DUTY value and the DUTY integrated value in the flying apparatus 10. In this graph, the horizontal axis indicates elapsed time. The vertical axis on the left indicates the DUTY value. The vertical axis on the right indicates the DUTY integrated value.

Here, DUTY values outputted from the flight controller 17 respectively to the ESC 141 to the ESC 144 in order to rotate the four motors 121 to 124 included in the flying apparatus 10 are shown. The DUTY value outputted to the ESC 141 is indicated by a solid line, the DUTY value outputted to the ESC 142 is indicated by a dashed line, the DUTY value outputted to the ESC 143 is indicated by a dash-dot line, and the DUTY value outputted to the ESC 144 is indicated by a dash-dot-dot line. In addition, the DUTY integrated value is indicated by a thick solid line.

As is clear from the graph shown in FIG. 4, there is a positive correlation between the continuous flight time of the flying apparatus 10 and the DUTY integrated value. That is, as the flight time increases, the DUTY integrated value increases. Here, with reference to FIG. 2, the DUTY integrated value may be an integrated value of DUTY values supplied to one ESC 141, or may be calculated from a plurality of DUTY values of the ESC 141 to the ESC 144. In the case of calculating the DUTY integrated value from the ESC 141 to the ESC 144, the DUTY integrated value may be calculated by individually integrating the DUTY values in each of the ESC 141 to the ESC 144, and combining the DUTY values integrated individually.

Figure 5:
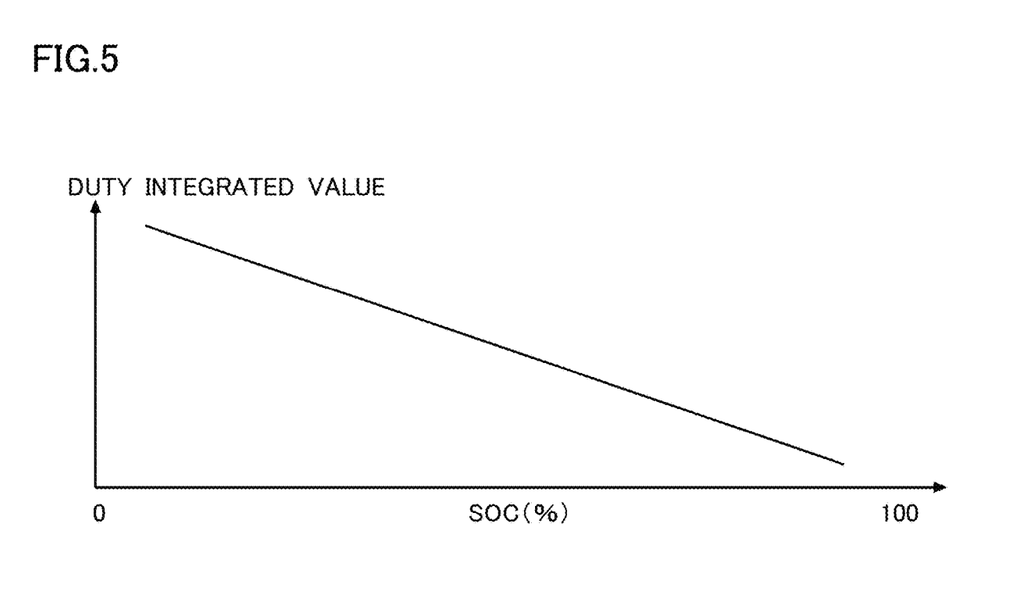
FIG. 5 is a graph showing a relation between the DUTY integrated value and SOC in the flying apparatus according to the embodiment of the present invention.

Next, the companion controller 24 calculates the SOC from the DUTY integrated value. Specifically, the companion controller 24 creates a relational formula indicating a relation between the DUTY integrated value and the SOC by using a statistical method such as a least-squares method or the like. The companion controller 24 calculates the SOC from the DUTY integrated value by using this relational formula.

Here, in consideration of the fact that the longer the continuous flight time is, the smaller the SOC is, there is a negative correlation between the SOC and the DUTY integrated value. In addition, even with a similar flight time, the DUTY value to be supplied to the power converting unit 14 increases when the motor 12 is to be rotated at a high speed, and as a result, a consumed electric power increases, so that the SOC decreases. With this taken into account, in the present embodiment based on the DUTY integrated value, both of the flight time and the rotation can be considered, so that the SOC is precisely calculated.

In step S13, the companion controller 24 and the flight controller 17 transmit information indicating the SOC of the battery 21. Specifically, the information indicating the SOC is transmitted from the flying apparatus 10 to the display device 22 through the communication unit 25 and the operating device 28 by means of wireless communication.

In step S14, the SOC of the battery 21 is displayed on the display unit 23 of the display device 22. By visually checking the display unit 23, the operator can know the SOC of the battery 21. Therefore, if the SOC of the battery 21 becomes a certain level or lower, the operator can move the flying apparatus 10 to a certain position, and charge or replace the battery 21. In this way, the fall of the flying apparatus 10 due to a reduced SOC of the battery 21 can be suppressed.

The aforementioned present embodiment makes it possible to achieve major advantageous effects as follows.

A flying apparatus of the present invention comprises: a rotor; a motor; a power converting unit; a battery; and a calculation control unit, wherein the rotor rotates to generate thrust for causing an airframe base unit to float, the motor is supplied with an electric power from the battery to rotationally drive the rotor, the calculation control unit generates an instruction signal to bring the airframe base unit into a certain positional posture, the power converting unit adjusts the electric power to be supplied from the battery to the motor based on the instruction signal inputted, and further the calculation control unit estimates a remaining charge of the battery based on the instruction signal. According to the flying apparatus of the present invention, the remaining charge of the battery can be precisely estimated without need of a sensor dedicated for measuring a current value or a voltage value of the battery, by estimating the remaining charge of the battery based on the instruction signal.

In addition, in the flying apparatus of the present invention, the instruction signal is a DUTY value. According to the flying apparatus of the present invention, the remaining charge of the battery can be precisely estimated from the DUTY value.

In addition, in the flying apparatus of the present invention, the instruction signal is an integrated value of a DUTY value. According to the flying apparatus of the present invention, the remaining charge of the battery can be precisely estimated from the integrated value (DUTY integrated value) of the DUTY value.

In addition, in the flying apparatus of the present invention, the instruction signal is an integrated value of an average value of a DUTY value. According to the flying apparatus of the present invention, the remaining charge of the battery can be further precisely estimated from the integrated value of the average value of the DUTY value.

In addition, the flying apparatus of the present invention comprises: a plurality of the rotors; a plurality of the motors; and a plurality of the power converting units, wherein the calculation control unit estimates the remaining charge of the battery from an integrated value of DUTY values supplied respectively to the plurality of power converting units. According to the flying apparatus of the present invention, the SOC can be precisely calculated from the integrated value of the plurality of DUTY values.

In addition, in the flying apparatus of the present invention, the calculation control unit calculates an initial value or an intermediate value of the remaining charge from a current value or a voltage value of the battery, calculates a decrease value of the remaining charge from a DUTY integrated value based on a conversion formula set in advance, and calculates the remaining charge at the time by reducing the decrease value of the remaining charge from the initial value or the intermediate value of the remaining charge. According to the flying apparatus of the present invention, the remaining charge during the flight can be precisely calculated by calculating the initial value or the intermediate value of the remaining charge from the current value or the like, and calculating the remaining charge based on these values, for example, even when the remaining charge at the time of takeoff is about half of the battery capacity.

Although the embodiments of the present invention have been described above, the present invention is not limited to these, and modification is possible without departing from the gist of the present invention. In addition, the aforementioned embodiments can be combined with each other.

For example, with reference to FIG. 3, the flying apparatus 10 may be configured to return to a predetermined position when the remaining charge calculated in step S12 becomes a certain level or lower. This makes it possible to suppress the fall of the flying apparatus 10 due to shortage of the remaining charge.

Moreover, although in the aforementioned present embodiment, the calculation control unit 15 calculates the SOC from the DUTY integrated value, the SOC can also be calculated by combining the current value or the voltage value and the DUTY integrated value. For example, first, the calculation control unit 15 calculates an initial value or an intermediate value of the SOC from a current value or a voltage value of the battery. Here, the initial value of the SOC is SOC at the time when the flying apparatus 10 takes off. In addition, the intermediate value of the SOC is SOC during the flight of the flying apparatus 10. The current value is a current value of a current supplied from the battery 21 to the power converting unit 14. The voltage value is a voltage value of the battery 21.

Thereafter, the calculation control unit 15 calculates the decrease value of the SOC from the DUTY integrated value based on a conversion formula set in advance. Moreover, the calculation control unit 15 calculates the SOC at the time by reducing the decrease value of the SOC from the initial value or the intermediate value of the SOC.

REFERENCE SIGNS LIST

- 10 flying apparatus
- 11 rotor
- 111 rotor
- 112 rotor
- 113 rotor
- 114 rotor
- 12 motor
- 121 motor
- 122 motor
- 123 motor
- 124 motor
- 13 flight sensor
- 14 power converting unit
- 141 ESC
- 142 ESC
- 143 ESC
- 144 ESC
- 15 calculation control unit
- 16 airframe base unit
- 17 flight controller
- 21 battery
- 22 display device
- 23 display unit
- 24 companion controller
- 25 communication unit
- 26 communication unit
- 271 arm
- 272 arm
- 273 arm
- 274 arm
- 28 operating device
- 32 leg portion
- 33 leg portion

The invention claimed is:

1. A flying apparatus comprising:
a rotor;
a motor;
a power converting unit;
a battery; and
a calculation control unit, wherein
the rotor rotates to generate thrust for causing an airframe base unit to float,
the motor is supplied with an electric power from the battery to rotationally drive the rotor,
the calculation control unit generates an instruction signal to bring the airframe base unit into a certain positional posture,
the power converting unit adjusts the electric power to be supplied from the battery to the motor based on the instruction signal inputted, and further
the calculation control unit estimates a remaining charge of the battery based on the instruction signal.

2. The flying apparatus according to claim 1, wherein the instruction signal is an integrated value of a DUTY value.

3. The flying apparatus according to claim 1, comprising:
a plurality of the rotors;
a plurality of the motors; and
a plurality of the power converting units, wherein
the calculation control unit estimates the remaining charge of the battery from an integrated value of DUTY values supplied respectively to the plurality of power converting units.

4. The flying apparatus according to claim 1, wherein the calculation control unit
calculates an initial value or an intermediate value of the remaining charge from a current value or a voltage value of the battery,
calculates a decrease value of the remaining charge from a DUTY integrated value based on a conversion formula set in advance, and
calculates the remaining charge at the time by reducing the decrease value of the remaining charge from the initial value or the intermediate value of the remaining charge.

5. A method for controlling a flying apparatus including a rotor, a motor, a power converting unit, a battery, and a calculation control unit, the method comprising:
rotating the rotor to generate thrust for causing an airframe base unit to float;
supplying the motor with an electric power from the battery to rotationally drive the rotor;
causing the calculation control unit to generate an instruction signal to bring the airframe base unit into a certain positional posture;
causing the power converting unit to adjust the electric power to be supplied from the battery to the motor based on the instruction signal inputted; and further
causing the calculation control unit to estimate a remaining charge of the battery based on the instruction signal.

6. The method for controlling a flying apparatus according to claim 5, wherein an integrated value of a DUTY value is used as the instruction signal.

7. The method for controlling a flying apparatus according to claim 5, wherein
the flying apparatus includes:
a plurality of the rotors;
a plurality of the motors; and
a plurality of the power converting units, and
the calculation control unit estimates the remaining charge of the battery from an integrated value of DUTY values supplied respectively to the plurality of power converting units.

8. The method for controlling a flying apparatus according to claim 5, wherein
the calculation control unit
calculates an initial value or an intermediate value of the remaining charge from a current value or a voltage value of the battery,
calculates a decrease value of the remaining charge from the DUTY integrated value based on a conversion formula set in advance, and
calculates the remaining charge at the time by reducing the decrease value of the remaining charge from the initial value or the intermediate value of the remaining charge.

* * * * *